US008843648B2

(12) United States Patent
Appiah et al.

(10) Patent No.: US 8,843,648 B2
(45) Date of Patent: *Sep. 23, 2014

(54) EXTERNAL ACCESS AND PARTNER DELEGATION

(75) Inventors: Madan R. Appiah, Redmond, WA (US); Malcolm Erik Pearson, Kirkland, WA (US); Daniel Kershaw, Mercer Island, WA (US)

(73) Assignee: Microsoft Corporation, Redmond, WA (US)

(*) Notice: Subject to any disclaimer, the term of this patent is extended or adjusted under 35 U.S.C. 154(b) by 862 days.

This patent is subject to a terminal disclaimer.

(21) Appl. No.: 12/472,120

(22) Filed: May 26, 2009

(65) Prior Publication Data

US 2010/0306393 A1 Dec. 2, 2010

(51) Int. Cl.
*G06F 15/16* (2006.01)
*G06Q 10/10* (2012.01)

(52) U.S. Cl.
CPC ..................................... *G06Q 10/10* (2013.01)
USPC .......................................................... 709/229

(58) Field of Classification Search
CPC ..................... G06F 21/6218; G06F 2221/2141
USPC .................. 709/223–229; 718/100
See application file for complete search history.

(56) References Cited

U.S. PATENT DOCUMENTS

| | | | |
|---|---|---|---|
| 6,182,142 B1* | 1/2001 | Win et al. | 709/229 |
| 6,453,353 B1* | 9/2002 | Win et al. | 709/229 |
| 6,792,462 B2* | 9/2004 | Bernhardt et al. | 709/225 |
| 7,080,077 B2 | 7/2006 | Ramamurthy et al. | |
| 7,085,834 B2 | 8/2006 | Delany et al. | |
| 7,185,364 B2* | 2/2007 | Knouse et al. | 726/8 |
| 7,206,851 B2* | 4/2007 | Delaney et al. | 709/229 |
| 7,464,162 B2* | 12/2008 | Chan | 709/225 |
| 7,475,151 B2 | 1/2009 | Delany | |
| 7,730,523 B1* | 6/2010 | Masurkar | 726/4 |
| 2001/0037395 A1* | 11/2001 | Sabat, Jr. et al. | 709/229 |
| 2002/0065864 A1* | 5/2002 | Hartsell et al. | 709/100 |
| 2002/0133579 A1* | 9/2002 | Bernhardt et al. | 709/223 |
| 2002/0174365 A1* | 11/2002 | Antonov et al. | 713/201 |
| 2002/0184391 A1* | 12/2002 | Phillips | 709/248 |
| 2005/0050226 A1* | 3/2005 | Larson | 709/245 |

(Continued)

OTHER PUBLICATIONS

Office Action dated Jan. 18, 2012 U.S. Appl. No. 12/472,129.

(Continued)

*Primary Examiner* — Rupal Dharia
*Assistant Examiner* — Marcus McKenzie
(74) *Attorney, Agent, or Firm* — Ben Tabor; Sade Fashokun; Micky Minhas

(57) ABSTRACT

Embodiments disclosed herein extend to the use of external access objects in a multi-tenant environment. First and second tenants contract for operations that users of the second tenant will perform in the first tenant. Identity criteria for the users are determined. These users are mapped to an external access object that represents the second tenant users when performing the operations in the first tenant. The external access object is also associated with the resources and/or data that the users of the second tenant will be allowed access to when performing the operations. The users of the second tenant provide a request for access to the resources and/or data to perform operations. Identity criteria are determined and the users are mapped to an external access object based on the identity criteria. It is determined if the user has permission to access the resources and/or data and perform the operations.

20 Claims, 7 Drawing Sheets

(56) References Cited

U.S. PATENT DOCUMENTS

| | | | |
|---|---|---|---|
| 2005/0165956 A1* | 7/2005 | Lee | 709/238 |
| 2006/0026229 A1* | 2/2006 | Ari et al. | 709/203 |
| 2006/0206593 A1* | 9/2006 | Lingafelt et al. | 709/220 |
| 2007/0067437 A1* | 3/2007 | Sindambiwe | 709/224 |
| 2007/0088741 A1* | 4/2007 | Brooks et al. | 707/103 R |
| 2008/0082540 A1* | 4/2008 | Weissman et al. | 707/9 |
| 2008/0086735 A1* | 4/2008 | Cheenath et al. | 719/313 |
| 2008/0184336 A1* | 7/2008 | Sarukkai et al. | 726/1 |
| 2008/0256250 A1* | 10/2008 | Wakefield | 709/229 |
| 2009/0037492 A1* | 2/2009 | Baitalmal et al. | 707/201 |
| 2009/0049422 A1* | 2/2009 | Hage et al. | 717/104 |
| 2009/0089625 A1* | 4/2009 | Kannappan et al. | 714/39 |
| 2009/0144802 A1* | 6/2009 | Tillery et al. | 726/1 |
| 2010/0125612 A1* | 5/2010 | Amradkar et al. | 707/802 |
| 2010/0205243 A1* | 8/2010 | Brady | 709/203 |

OTHER PUBLICATIONS

Notice of Allowance dated May 21, 2014 cited in U.S. Appl. No. 12/472,129.

* cited by examiner

EXTERNAL ACCESS AND PARTNER DELEGATION

BACKGROUND

Computing technology has contributed enormously to the advancement of humankind. Computing systems come in a wide variety of physical forms including desktop computers, laptop computers, personal digital assistants, telephones, and even devices that have not been conventionally thought of as computing systems such as, for example, refrigerators and automobiles. Thus, a computing system may be any device or system that has a processor and a memory of any type.

One type of computing system is a multi-tenant system. A multi-tenant system includes multiple tenants that share resources at a management console. In addition, each tenant may have their own resources and data that is stored at the management console. To ensure security, the data and resources belonging to one tenant are not accessible by users of another tenant.

Each tenant typically includes an administrator that has permission to perform administrative tasks on the resources and users of the tenant. For example, the administrator may change the password of a tenant user or may add a new tenant user. The tenant administrator may also delegate permission to perform the administrative tasks to other users that are associated with the tenant. In this way, the other users of the tenant may also perform the administrative tasks when needed

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments disclosed herein are directed towards defining external access objects that represent users of a second tenant when performing operation in a first tenant in a multi-tenant environment. The external access object allow the first tenant to control access of the users of the second tenant to resources and/or data of the first tenant and allows the second tenant users to gain permission to access the resources and/or data.

In one embodiment identity criteria for a user or group of users of the second tenant that desire to perform operations is defined. An external access object is mapped to the user or group of users based on the identity criteria. The external access object is associated with resources and/or data that the user or group of users is allowed to access.

In another embodiment, a user request is received from a user associated with a second tenant and user criteria are determined. The user is mapped to an external access object based on the identity criteria. It may then be determined if the user has permission to access the requested resources and/or data and to perform the operations based on the mapping to the external access object.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION

Figure 1:
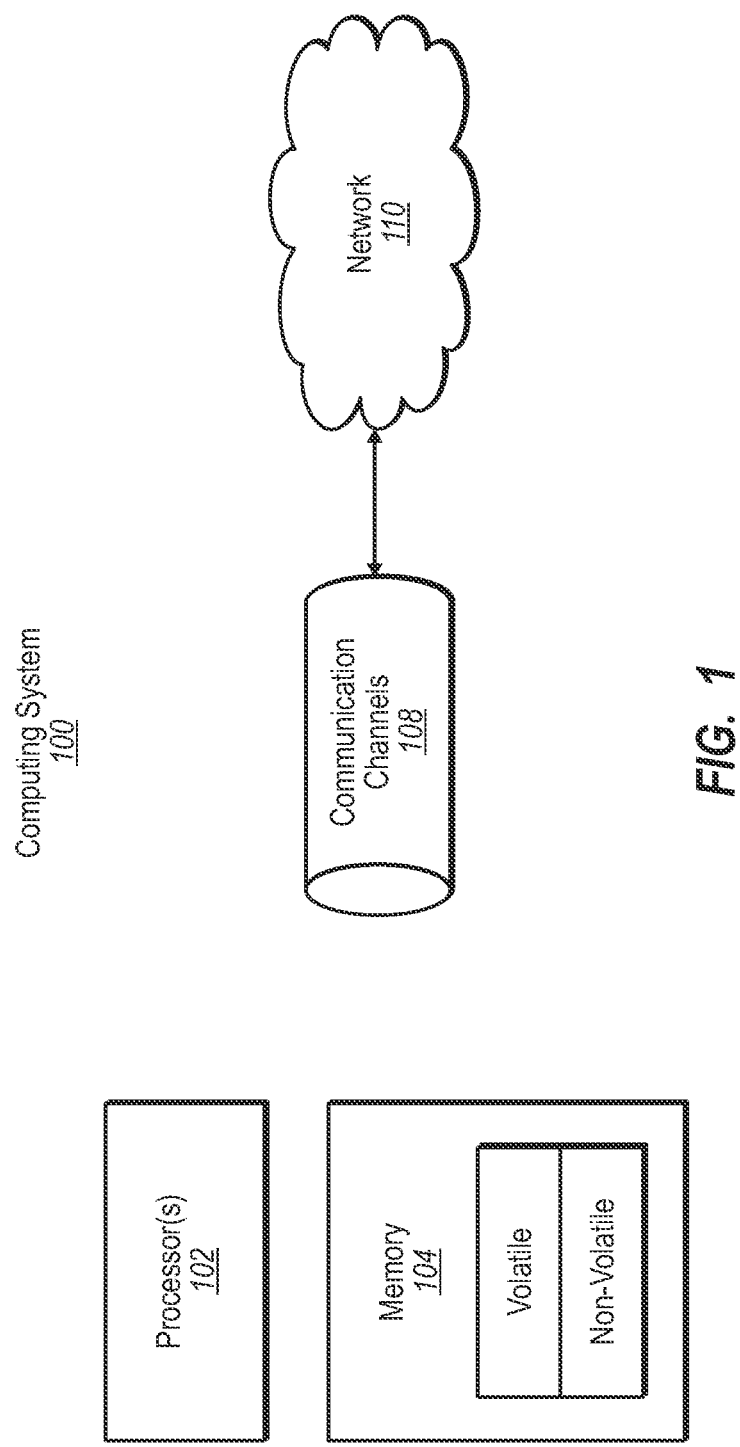
FIG. 1 illustrates a computing system in which in which the embodiments disclosed herein may operate.

Embodiments disclosed herein extend to the use of external access objects in a multi-tenant environment. The first and second tenants may contract for operations that users of the second tenant will perform in the first tenant. Identity criteria for the users of the second tenant may be determined. These users may then be mapped to an external access object that represents the second tenant users when performing the operations in the first tenant. The external access object may also be associated with the resources and/or data that the users of the second tenant will be allowed access to when performing the operations.

In additional embodiments, the users of the second tenant provide a request for access to the resources and/or data of the first tenant to perform operations. Identity criteria is determined and the users are mapped to an external access object based on the identity criteria. Finally, it is determined if the user has permission to access the resources and/or data and perform the operations.

First, an example computing system will be described in which the principles of the present invention may be used with respect to FIG. 1. Then, the principles of the present invention will be described in further detail with respect to the subsequent Figures.

Embodiments described herein may comprise or utilize a special purpose or general-purpose computer including computer hardware, as discussed in greater detail below. Embodiments also include physical computer-readable media for carrying or storing computer-executable instructions and/or data structures. Such computer-readable media can be any available physical media that can be accessed by a general purpose or special purpose computer system. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 shows a schematic diagram of an example computing system 100 that may be used to implement features described herein. The described computing system is only one example of such a suitable computing system and is not intended to suggest any limitation as to the scope of use or functionality of the invention. Neither should the invention be interpreted as having any dependency or requirement relating to any one or combination of components illustrated in FIG. 1.

Referring to FIG. 1, in its most basic configuration, a computing system 100 typically includes at least one processing unit 102 and memory 104. The memory 104 may be system memory, which may be volatile, non-volatile, or some combination of the two. An example of volatile memory includes Random Access Memory (RAM). Examples of non-volatile memory include Read Only Memory (ROM), flash memory, or the like. The term "memory" may also be used herein to refer to non-volatile mass storage such as physical storage media. Such storage may be removable or non-removable, and may include (but is not limited to) PCMCIA cards, magnetic and optical disks, magnetic tape, and the like.

As used herein, the term "module" or "component" can refer to software objects or routines that execute on the computing system. The different components, modules, engines, and services described herein may be implemented as objects or processes that execute on the computing system (e.g., as separate threads). While the system and methods described herein may be implemented in software, implementations in hardware, and in combinations of software and hardware are also possible and contemplated.

In the description that follows, embodiments of the invention are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other computing systems over, for example, network 110.

Figure 2:
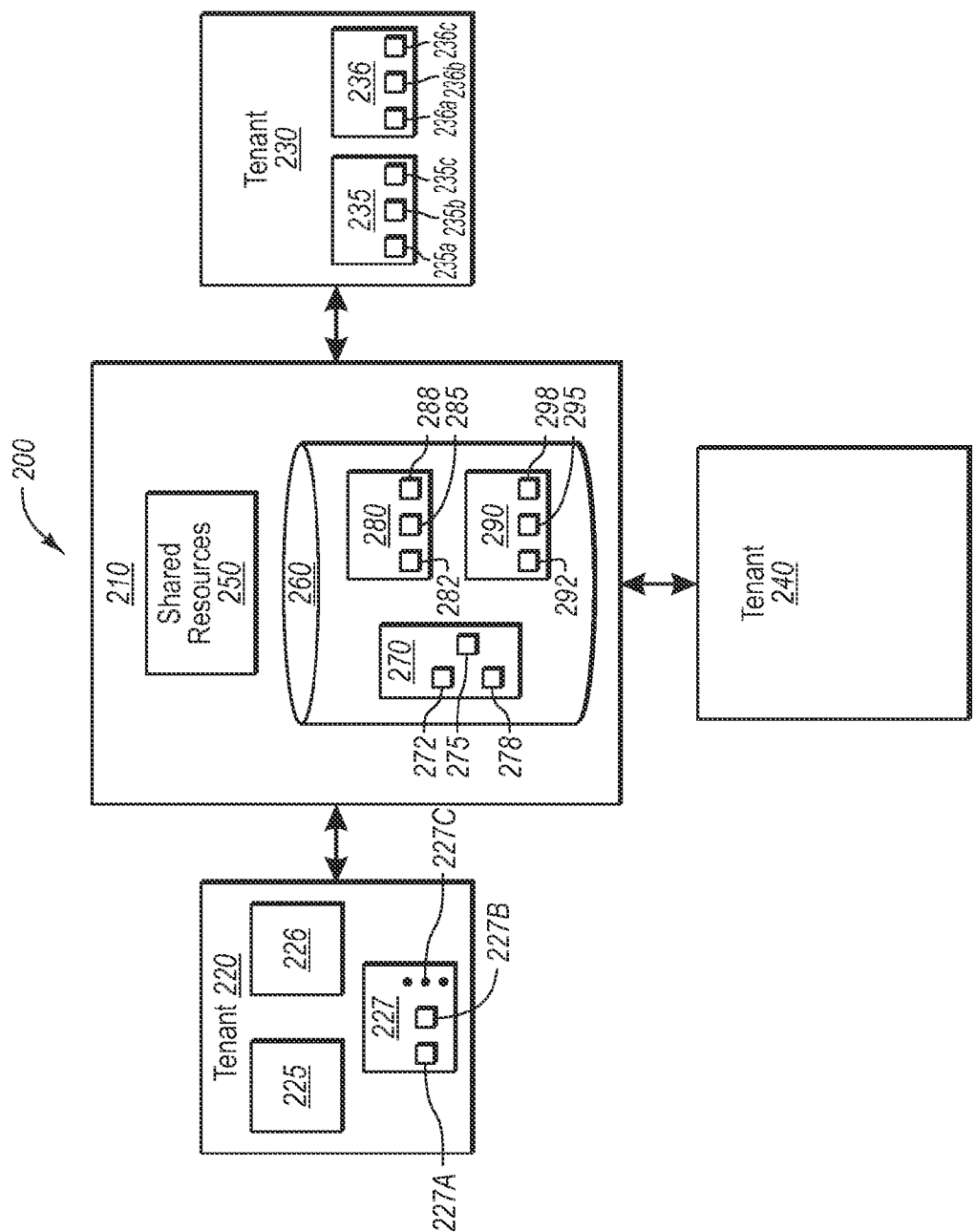
FIG. 2 illustrate a multi-tenant computing system in which the embodiments disclosed herein may be performed.

Attention is now made to FIG. 2, which illustrates a multi-tenant computing system 200. As illustrated, the computing system 200 includes a management console or service center 210, which may correspond to computing system 100, although this is not required. The computing system 200 also includes various tenants 220, 230, and 240. A tenant is a company, organization, other group of users, or a single user who access and use the services and resources that are resident on management console 210. As will be appreciated, although three tenants are illustrated, any number of additional tenants may also access management console 210 as circumstances warrant.

As illustrated, the management console 210 hosts shared resources 250. The shared resources 250 may be software that the various tenants use in their business endeavors. For example, the shared resources may include email, communication, meeting, customer management, and collaboration software. It will be appreciated that the shared resources may include numerous other types of software and other services as circumstances warrant. In operation, the users of a tenant such as tenant 220 access the shared resources 250 to perform various operations. For example, the users of tenant 220 may access the email software to send email or may access the collaboration software for collaborative tasks. Likewise, the users of tenants 230 and 240 may also access the shared resources 250 as needed.

As is illustrated, the management console 210 also includes a storage component 260. The storage component 260 is configured to allow each tenant to store data and other resources that are unique to that tenant. For example, the tenant 220 may have access a memory portion 270 for storing unique data and other resources unique to tenant 220, the tenant 230 may have access a memory portion 280 for storing the unique data and other resources to tenant 230, and the tenant 240 may have access a memory portion 280 for storing the unique data and other resources to tenant 240.

The data portion 270 may include data 272 and resources 275. The data 272 may include data that is manipulated by the shared resources 250. The resources may include various resources unique to tenant 220. As will be appreciated, the data portion 270 is structured to be a secure storage component that can only be accessed by the users of tenant 230. That is, although the users of tenants 240 and 250 may also have access to storage component 260, these users will not be able to access the data 272 and resources 275. Thus, the data and resources of tenant 230 are protected from outside users.

The storage portion 270 may also include administrative resources 278. The administrative resources 278 provide administrative control to an administrator 225 of tenant 220. The administrative resources 278 will be described in more detail to follow.

As also illustrated, the storage portion 280 may also include data 282, resources 285, and administrative resources 288. Likewise, storage portion 290 may also include data 292, resources 295, and administrative resources 298.

Particular attention is now made to tenant 220. As shown, tenant 220 includes various users who may access the resources and data hosted on management console 210. The various users may access the management console either from a physical location of the tenant 220 or from some location that is remote to tenant 220.

As previously mentioned, the tenant 220 includes an administrator 225 who performs administrative tasks for the tenant 220. In addition, the tenant 220 may include a user 226 who is an individual associated with the tenant 220 who accesses the management console 210. Tenant 220 may also include a group of users 227, comprised of users 227A, 227B, and potentially any number of additional users as represented by ellipses 227C. In some embodiments, the group 227 may be a department of the tenant 220.

The tenant 230 may also include various users. In some embodiments, the users of tenant 230 may provide services to tenants 220 and/or 240. In such embodiments, the users of tenant 230 may be assigned a group membership. For example, a group 235 may include user 235a, 235b, and 235c. This group may be a helpdesk group that provides helpdesk services to the other tenants. Likewise, a group 236 may include users 235a, 236a, and 236b. This group may be a management group that provides management services to the other tenants. As illustrated, the user 235a is part of both groups. Thus, a user of tenant 230 may be part of more than one group. It will be appreciated that tenant 230 may have any number of additional users and groups and that each group may have any number of users as needed.

Currently, a user from one tenant may not access the resources or data of another tenant. However, there may be circumstances when it would be beneficial for the administrator 225 to allow the groups 235 and 236 access to the resources and data of tenant 220 so that the groups may provide services to the tenant 220. Advantageously, the embodiments disclosed herein provide a mechanism for the administrator 225 to provide access to the resources and data of tenant 220 to an external user, such as the users of tenant 230.

Figure 3:
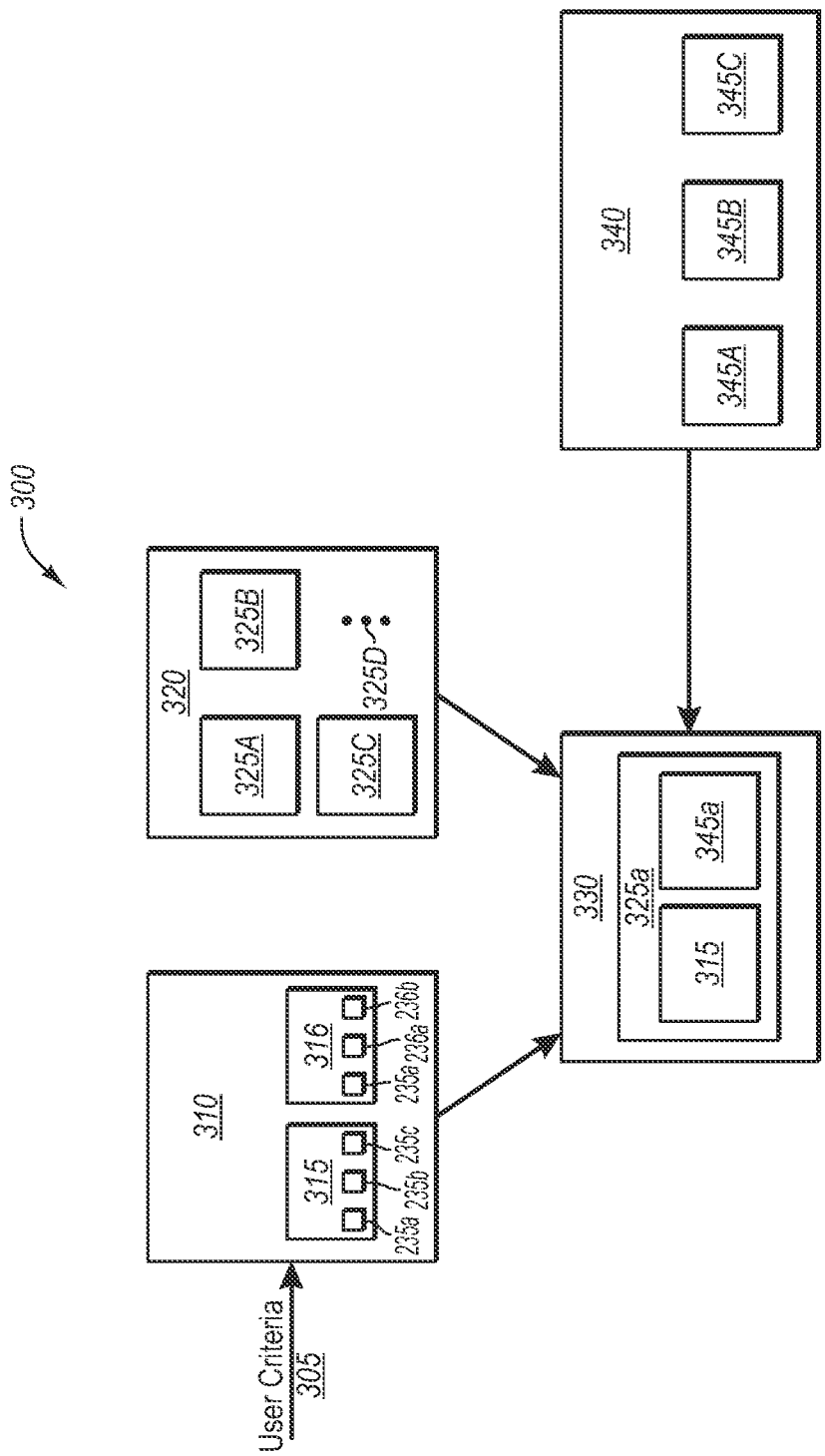
FIG. 3 illustrates a portion of the multi-tenant computing system of FIG. 2 in which the embodiments disclosed herein may be performed.

Attention is now made to FIG. 3, which illustrates a system 300 of the management console 210 that is configured to allow a tenant administrator to provide access resources and data to a user who is external to the tenant. The system 300 may correspond to the administrative resources 278 previously described, although this is not required. It will be appreciated that although the system 300 is shown as comprising various modules, in some embodiments there may be more or less than the illustrated modules. In addition, although the modules are shown as being separate modules, in some embodiments the illustrated modules may be combined or may be part of another module. Further, the various modules of system 300 may include software, hardware, or any combination of software and hardware as circumstances warrant.

As shown in FIG. 3, system 300 includes an identity module 310. The user module 310 is configured to allow a tenant administrator to assign individual users of an external tenant who desire access to the resources and data of the tenant with a group membership based on user criteria. The group membership will typically be associated with an administrative role that the external tenant members will perform.

For example, tenant 220 may contract with tenant 230 to provide one or more administrative services so that tenant 220 need not provide the services or so that additional services are available to the users of tenant 220. These administrative services may include helpdesk or other support services, management operation services, or other administrative services.

As part of the contract, the tenant 230 may indicate which users associated with tenant 230 are to perform the contracted services. The tenant 230 may then provide user criteria 305 that identifies the individual users who will access the resources and/or data of the tenant 220 to provide the contracted services. The user criteria 305 may include a user ID, such as a global identifier that represents the name of the user such as an email address of a user, the role of the user in tenant 230 and/or the name of tenant 230. The user criteria 305 may also include a digital certificate, token or other commonly used digital information.

The user criteria 305 for each user are received by the identity module 310. The identity module then uses the user criteria 305 for a given user to assign that user to a group membership based on a role the user will perform.

For instance, as mentioned previously, the users 235a, 235b, and 235c may comprise a helpdesk group that provides helpdesk services. Accordingly, the identity module 310 may, based on the user criteria 305 for each of the users 235a, 235b, and 235c, assign them to a helpdesk group 315. Likewise, the identity module may assign, based on the user criteria 305, the users 235a, 236a, and 236b to a management group 316 since these users are part of a management group that provides management services. The user 235a is assigned to both groups as he or she is able to perform both helpdesk services and management services.

In some embodiments a user of the tenant 230 may be the only member of a group. In such embodiments, the identity module 310 will assign the individual user to his or her individual group.

The identity module will keep track of which users of tenant 230 are assigned to each group. The members of the group may be changed as needed by providing different user information 305. For example, tenant 230 may provide new user information 305 that identifies a new helpdesk user who may be added to the group 235. In addition, the tenant 230 may indicate that a user is no longer to be part of the group so that identity module 310 may remove that user from the group 235 or another group.

In an alternative embodiment, the users of tenant 230 may desire to collaborate with users of tenant 220 on one or more documents that are included in the data of the tenant 220. In such cases, the tenant 230 would identify those users that should be given access to the documents of the tenant 230 and would provide user criteria 305 that identify these individual users as discussed. The identity module would then place these users into a collaboration group as previously explained.

The system 300 also includes an external access module 320 that is configured to define various external access objects (herein after also referred to simply as external access objects 325) 325a, 325b, 325c, and potentially any number of additional external access objects as illustrated by the ellipses 325d may be defined. The external access objects 325 are configured to represent an external user or group of users when performing operations on the resources or data of tenant. The external access objects will typically be associated with an administrative role that the external tenant members will perform. Examples of administrative roles include, but are not limited to company administrative role, license administrative role, service administrative role, helpdesk administrative role, user role, and user administrative role. The external access objects may also be associated with a collaboration role.

The system 300 further includes an assign or mapping module 330. In operation, the assign or mapping module 330 receives a group that has been defined by the identity module 310. The mapping module also accesses an external access object 325 from the external access object module 320 that is appropriate for the group and maps the two together.

For example, as mentioned above, the group 315 may correspond to a helpdesk group. The mapping module 330 maps the group 315 to an external access object 325a that also corresponds to a helpdesk group. The external access object 325a will then represent all the individual users of the group 315 as they perform helpdesk operations in the tenant 220.

Once the external access object has been mapped to the group such as group 315, the group 315 may be assigned or associated with various resources and/or data that may be accessed. Once accessed, operations may be performed on the resources and/or data. Accordingly, a module 340 that is configured to allow an administrator to specify resources and data of the tenant that would be appropriate for a given role to perform tasks on. For example, a resource 345a may correspond to one or more resources that are appropriate to have helpdesk operations performed on them. Resources 345b may correspond to one or more resources that are appropriate to have management operations performed on them. Data or documents 345c may correspond to data or documents appropriate for collaborative efforts.

The mapping module 330 may access those resources and/or data that are appropriate for a given external access object and may associate them with the appropriate external access object. For example, the external access object 325a may be associated with the resources 345a as both relate to helpdesk role. As will be explained in more detail to follow, an external user who requests access to the resources and/or data of tenant 220 will only be given access to those resources or data that are associated with the external access object that is mapped to the external user.

Figure 4:
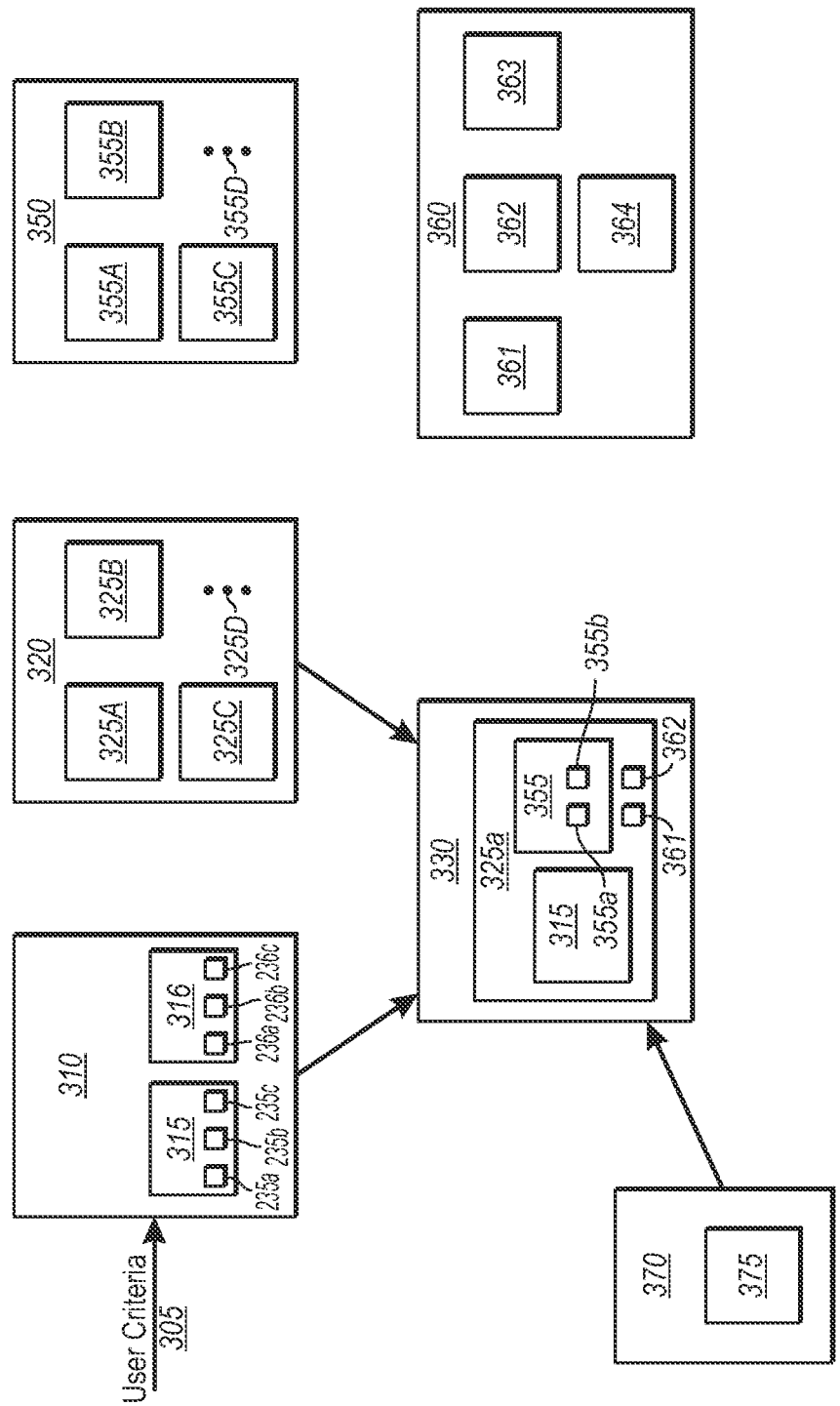
FIG. 4 illustrates an alternative embodiment of the portion of FIG. 3.

In a specific embodiment, various administrative tasks that define the operations that the external users of the group mapped to the external object may perform on the resources and data of the tenant may be defined. Accordingly, the module 340 may be a task module 350 that is configured to allow for the definition of various administrative tasks that may be performed on the data and resources of the first tenant 220 as illustrated in FIG. 4.

As shown, numerous administrative tasks (herein after also referred to simply as administrative tasks 355) 355a, 355b, 355c, and potentially any number of additional administrative tasks as illustrated by the ellipses 355d may be defined. Examples of administrative tasks include, but are not limited, to add domain, delete domain, assign role, unassigned role, assign license, remove license, add user, delete user, manage services, read users list, modify user information, reset password, read license agreement, create help ticket, read help ticket, modify help ticket, delete help ticket, and monitor service status.

The mapping module 330 is configured to access a set of the administrative tasks 355 that are appropriate for the external access object 325. For example, since the external access object 325a corresponds to a helpdesk administrative role, then the mapping module 330 would associate those administrative tasks 355 that are appropriate for the helpdesk administrative role. In FIG. 4, the external access object 325a is shown as being associated with a set of administrative tasks 355 that includes administrative tasks 355a and 355b that are appropriate for the helpdesk role.

The system 300 also includes target objects 360 that are to be subjected to the administrative tasks 355. The target objects may include all the users of a tenant and data that is associated with a tenant. For example, the objects 360 may include target objects 361 and 362 that correspond to the administrator 225, the user 226 or the individual users 227a, 227b and 227c that comprise the department 227. Alternatively, a target object 363 may correspond to the department 227. A target object 364 may correspond to data associated with the tenant such as data 272. This data may be a set of documents.

As with the administrative tasks 355, the target objects 360 or a subset thereof may be assigned or associated to with an external access object 325a. The grouping of target objects is called scope. In one embodiment, the scope is set for all target objects associated with a tenant. In such embodiments, any administrative tasks associated with an external access object 325 may be performed on all the target objects.

However, in other embodiments the administrator may limit the scope for an external access object 325. In such embodiments, the target objects may be limited. Accordingly, the scope will be less than all the target objects. For example, as shown in FIG. 4, the external access object 325a has been associated with target objects 361 and 362.

In alternative embodiments, the administrative tasks and target objects need not be directly associated with the external access object. Rather, the system 300 may include an administrative role module 370. The administrative role module includes various administrative roles 375 that have previously been assigned administrative tasks and target objects. That is, a helpdesk administrative role will have helpdesk administrative tasks assigned to it and will also have those target objects that are appropriate for a helpdesk role.

In operation, the mapping module will access the administrative 375 that is appropriate for the external access object. As illustrated in FIG. 4, since the external access object 325a is associated with the helpdesk group 315, an administrative role 375 corresponding to the helpdesk administrative role would be accessed by the mapping module and associated with the external object 325a.

Thus, the system 300 allows a first tenant such as tenant 220 to determine identity criteria for users of a second tenant such as tenant 230. The identity criteria is used to map an external access object to the users of the second tenant. The external access object is used to represent the users of the second tenant when performing operations on the resources or data of the first tenant. The first tenant may also associate administrative tasks and target objects with the external access object. In this way, when the users of the second tenant request access to the resources and data of the first tenant, the external access object may be used to authenticate the identity of the second tenant users and may also be used to authorize the performance of operations as will now be explained.

Figure 5:
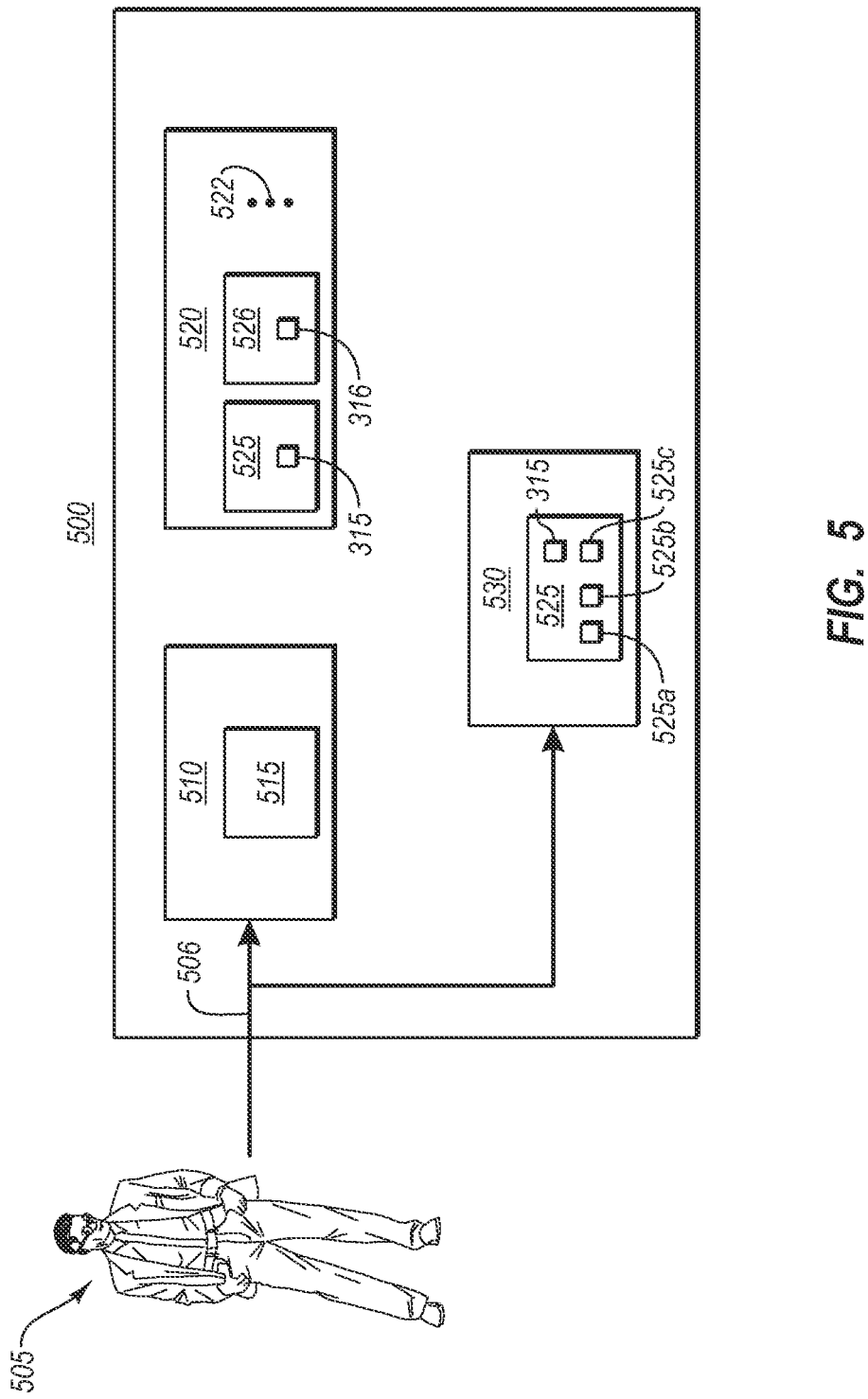
FIG. 5 illustrates an alternative portion of the multi-tenant computing system of FIG. 2 in which the embodiments disclosed herein may be performed.

Attention is now made to FIG. 5, which illustrates a system 500 of the management console 210 that is configured to allow a user of a second tenant permission to perform one or more administrative tasks based on an administrative role. The system 500 may correspond to the administrative resources 278 previously described, although this is not required. It will be appreciated that although the system 500 is shown as comprising various modules, in some embodiments there may be more or less than the illustrated modules. In addition, although the modules are shown as being separate modules, in some embodiments the illustrated modules may be combined or may be part of another module. Further, the various modules of system 500 may include software, hardware, or any combination of software and hardware as circumstances warrant.

As illustrated, an external or second tenant user 505, which may correspond to the users of tenant 230, provides a request 506 for access to resources or data of a tenant such as tenant 220. The user 505 may be an individual user such as user of the external tenant. Alternatively, the user may be a group of users.

The request 506 may contain information that identifies the user 505. For example, the information may correspond to the criteria 305 previously discussed. The request 506 may also include the resources and/or data the user 505 desires to access. In some embodiments, this may take the form of administrative tasks that the user 505 desires to perform and the target objects that are to be subjected to the administrative tasks.

The user request 506 is received by an identity module 510, which may correspond to the identity module 310. The identity module 510 uses the identification information to establish identity criteria 515 of the user 505.

As illustrated, an external access object module 520 includes external access object 525, 526, and potentially any number of additional administrative roles as illustrated by ellipses 527. The external access objects 525, 526, and potentially 527 have been associated a set of administrative tasks and a set of target objects either directly or through an administrative role as previously described.

The identify module 510 may then map the user 505 to one of the external access objects 525, 526, or 527 based on the identity criteria 515. For example, the user 505 may be the user 235a and may provide his or her email address or other identification, his or her name, the name of the tenant 230 and his or her role in the tenant 230 Using this information, the identity module 510 maps the user 235a to an external access object that previously was associated with this user as described above. As illustrated, the external access object 525 is associated with the helpdesk group 315 that includes the user 235a.

Once mapped to the external access object 525, the tenant 220 will view the user 235a of tenant 230 as a helpdesk user in the tenant 220. That is, the external access object 525 represents the user 235a from the tenant 220 viewpoint and is viewed as an authorized user.

Similarly, the user 505 may be the 235b of the tenant 230, who may provide user request information 506 that is used by the identity module 510 to establish identity criteria 515. This user is then mapped to the external access object 525 since the user 235b is also part of the helpdesk group. As with the user 235a, the user 235b is represented by the external access object 525. Thus, the tenant 220 views all the external users mapped to the external access object 525 as a single user, in this case a helpdesk user, who may be authorized to perform operations on the resources and data of the tenant 220.

In some embodiments, however, the identify 510 module may determine that none of the external access objects 525, 526, or 527 are associated with the identity criteria 515. In such embodiments, the system 500 will deny access to the user 505.

A permission module 530 then receives the external access object 525 and the user request 506. The permission module 530 is configured to determine from the user request 506 which resources and/or data that the user 505 desires to access. For example, as previously discussed, the user 505 may desire to access various resources to provide contracted for services such as helpdesk or management services. Alternatively, the user 505 may desire to access various data or documents in a collaborative effort. In one embodiment, the user 505 may request to perform a set of administrative tasks on designated target objects of the tenant 220. In other embodiments, the user may request to collaborate on data or documents of the tenant 220.

The permission module 530 also determines if the external access object 525 is allowed to access the desired resources or data. As previously discussed, the external access object 525 will be associated with a set of the resources and/or data that the administrator 225 of tenant 220 desires the users of tenant 230 to have access to. For example, the resources and/or data 525a may correspond to the resources and/or data 345a that are appropriate for a helpdesk group to have access to since the external access object 525 is associated with the helpdesk role in the tenant 220. Accordingly, if the permission module 530 determines that the resources and/or data 525a correspond to requested resources and/or data, the permission module 530 will grant access to the desired resources and/or data. However, if the requested resources and/or data are not included, then permission is denied.

As mentioned above, in one embodiment the external access object 525 is associated with a set of administrative tasks that define the operations that may be performed on the resources and/or data. In this embodiment, while determining if access is to be granted, the permission module 525 determines if the desired administrative tasks are included as part of the set of administrative tasks 525b associated with the external access object 525. If the administrative tasks are included, then the permission module 530 grants the user 505 permission to perform the desired administrative tasks.

The permission module 530 is also configured to determine if the administrative tasks may be performed on desired target objects. The permission module 530 determines if the desired target objects are included as part of the set of target objects 525c associated with the external access object 525. If the target objects are included, then the permission module 530 grants the user 505 permission to perform the desired administrative tasks on the desired target objects. However, if the target objects are not included, then permission is denied.

In another embodiment, the permission module 530 may determine, while determining if access is to be granted, if the requested data or documents are associated with the external access object 525. If the data or documents are associated, then access is granted. If the data and documents are not associated with the external access module 525, then access is denied.

In some embodiments the user 505 may belong to more that one group. For example, the user 235a belongs to the helpdesk group 315 and the management group 316. Accordingly, the identity module 510 may determine, based on the identity criteria 515, that the user 505 also maps to the external access object 526 that is associated with the management group. As with external access object 525, the permission module 530 will then determine if the requested resources and/or data are associated with the external access object 526 and will allow access if the resources and/or data are included.

There may become circumstance where an administrator such as administrator 225 decides that it is no longer desirable for the user 505 to be given access to the resources or data of the tenant 225. For example, a user or group of users of a second tenant such as tenant 230 may breach the contracted agreement to provide services or other collaboration to a first tenant such as tenant 220. Accordingly, the administrator of the first tenant may disable the external access object that the user 505 is mapped to. In this way, the external access object will no longer be given permission to access the desired resources and/or data and thus will not be able to perform operations in the first tenant such as tenant 220. At a later date, should the first and second tenants resolve the contract issues, then the administrator may enable the external access object so that permission to access the resources and/or data is once again allowed.

Figure 6:
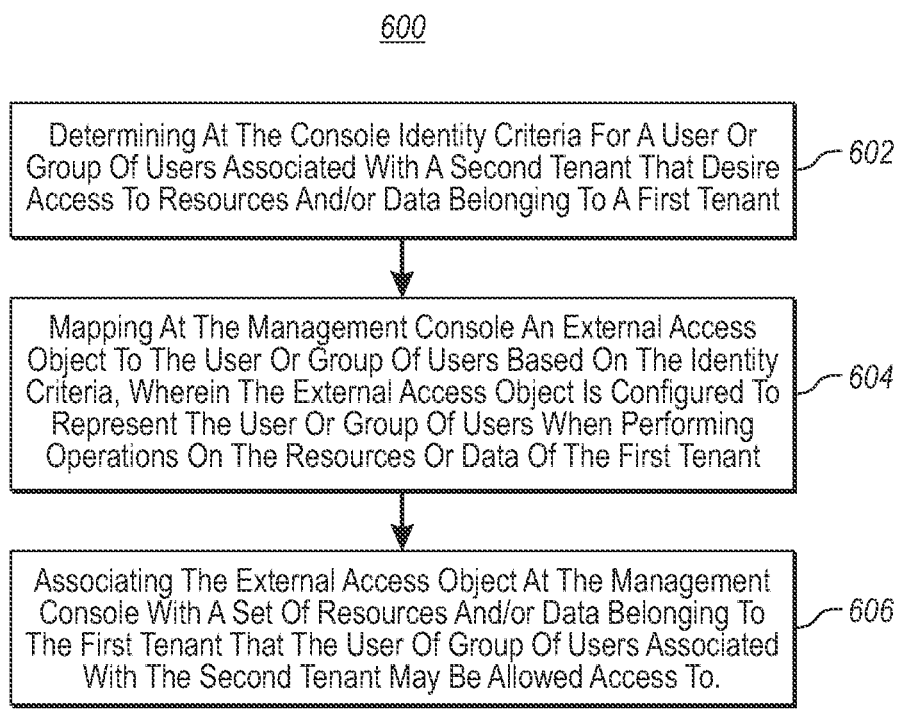
FIG. 6 illustrates a method for a computing system in a multi-tenant environment to allow a first tenant to specify access permission to its resources and/or data for a second tenant in accordance with embodiments disclosed herein.

FIG. 6 illustrates a method 600 for a computing system in a multi-tenant environment to allow for the first tenant to specify access permission to its resources and/or data for the second tenant. Method 600 will be described with frequent reference to the computing systems of FIGS. 2-5. Note, however, that the computing systems of FIGS. 2-5 are only examples of numerous computing systems that may be employed to practice method 600.

Method 600 includes determining 602 at the management console identity criteria for a user or group of users associated with a second tenant that desire access to resources and/or data belonging to a first tenant. For example, the identity module 310 may receive user criteria 305 from the tenant 230. The identity module 310 then uses the identity criteria 305 to associate the user or group of users from the tenant 230 with a group identity as previously explained. For instance, the user or group of users may be associated with a helpdesk group 315.

The method 600 also includes mapping 604 at the management console an external access object to the user or group of users based on the identity criteria. The external access object is configured to represent the user or group of users when performing operations on the resources or data of the first tenant. For example, the mapping module 330 may access the user or group of users determined in act 602 and may then map these users to an external access object 325 of external access module 320 that is appropriate for that group based on an administrative role.

In one embodiment, an external access object 325*a* corresponding to a helpdesk administrative role is mapped to the helpdesk group 315. Once mapped, the external access object 325*a* will represent all the users of the group 315 when performing operations in the tenant 220.

The method 600 further includes associating 606 the external access object at the management console with a set of resources and/or data belonging to the first tenant that the user of group of users associated with the second tenant may be allowed access to. For example, the module 340 may define those resources and/or data of the tenant 220 that the users of the group 315 are to be allowed access to and that should accordingly be associated with the external access object. The resources and/or data will typically be those resources and data that are appropriate for the operations the tenant 230 users will perform. In the case of the external access object 325*a*, the resources 345*a* will be associated as these resources are resources that are appropriate to have helpdesk operations performed on.

In some embodiments, the act 606 comprises associating with the external access object at the management console one or more administrative tasks that define operations that may be performed on the set resources and/or data and one or more target objects on which the assigned administrative tasks may be performed. In another embodiment, the act 606 comprises associating with the external access object at the management console one or more documents that may be subjected to a collaborative effort.

Figure 7:
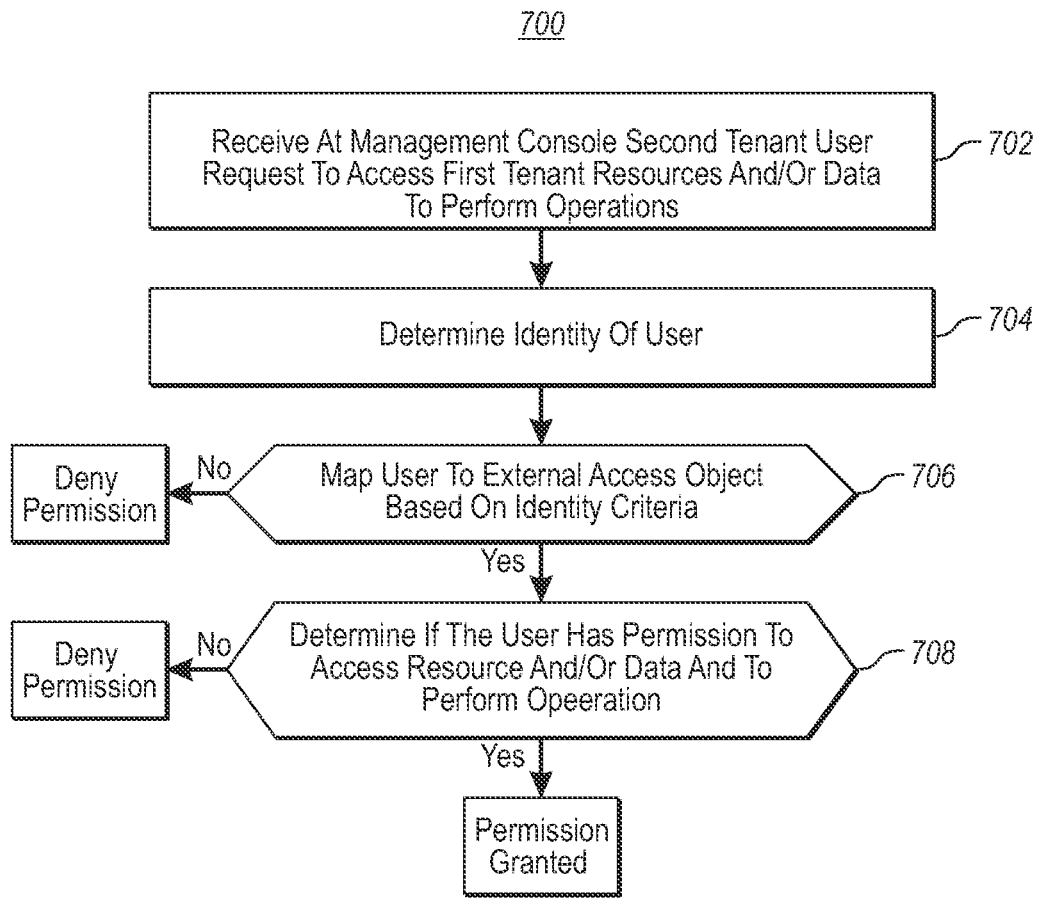
FIG. 7 illustrates a method for a user associated with a second tenant to obtain permission to access resources and/or data of a first tenant in accordance with embodiments disclosed herein

Turning now to FIG. 7, a method 700 for a user associated with the second tenant to obtain permission to access resources and/or data of the first tenant is illustrated. Method 700 will be described with frequent reference to the computing systems of FIGS. 2-5. Note, however, that the computing systems of FIGS. 2-5 are only one of numerous computing systems that may be employed to practice method 700.

Method 700 includes receiving 702 at the management console a user request of a user associated with the second tenant for access to a resource and/or data of the first tenant to perform operations. For example, the identity module 510 may receive the user input 506 from the tenant user 505. The user request 506 may specify what resources and/or data of the first tenant 220 the user 505 desires to access to perform operations on the resources and/or data. As described, the resources and data will typically be associated with the operations the user 505 desires to perform, whether the operations are collaborative tasks or services such as helpdesk operations.

The method 700 further includes determining 704 at the management console identity criteria of the user. For example, the user request 506 may include criteria 515 that allows the user module 510 to establish a group membership of the user 505, for instance as a member of group 315.

Method 700 also includes mapping 706 at the management console the user to an external access object based on the identity criteria, wherein the external access object is configured to represent the user when performing operations on the resources or data of the first tenant. For example, the identify module 510 may map the user 505 to one of the external access objects 525, 526, or 527 based on the user criteria 515 (yes in decision block 706). That is, the user 505 is mapped to the external access object that is appropriate for the user. For instance, the users associated with helpdesk group 315 may be mapped to the external access object 525 that corresponds to the helpdesk group. The external access object 525 will represent the users of group 315 when performing operations in the tenant 220.

In some embodiments, however, the identify module 510 may determine that no external access objects are associated with the criteria 515 (no in decision block 706). In such embodiments, the system 500 will deny permission to the user 505.

The method 700 further includes determining 708 at the management console if the user has permission to access the requested resource and/or data and to perform the operations on the requested resource and/or data based on the mapping to the external access object. For example, the permission module 530 may determine if the resources and/or data specified in the user request 506 are associated with the external access object 525 and if the user 505 may perform operations on the resources and/or data If not (no in decision block 708), permission is denied. If yes (yes in decision block 708), then permission is granted.

Although methods have been described with respect to FIGS. 6-7, the embodiments disclosed herein may extend to computer program products comprising one or more computer-readable media having thereon one or more computer-executable instructions that, when executed by one or more processors of the server computing system, cause the computing system to perform all or portions or either of these methods. For instance, referring to FIG. 1, memory 104 and communication channels 108 may represent examples of such computer-readable media. The memory 104 represents an example of physical computer-readable media in the form of physical storage and/or memory media. The embodiments disclosed herein also extend to computing systems themselves that are configured through hardware, software, or a combination of hardware and software, to perform all of portions of the methods of FIGS. 6-7.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, performed in a multi-tenancy environment, for permitting a first tenant to provide services to a second tenant by specifying access permission that enables the second tenant to access the first tenant's resources and/or data, the method comprising:
    hosting a multi-tenant service in a multi-tenancy environment, the multi-tenant service hosting a first and a second tenant;
    receiving at the management console identity criteria for a user or group of users of the second tenant that desire access to the first tenant's resources and/or data of the multi-tenant service without requiring the user or group of users of the second tenant to become users of the first tenant;
    creating at the management console an external access object that is associated with the first tenant;
    mapping at the management console the external access object to the user or group of users of the second tenant based on the identity criteria such that the external access object represents the user or group of users of the second tenant when the user or group of users access the multi-tenant service such that the user or group of users appear as a user or group of users of the first tenant when accessing the multi-tenant service to thereby enable the user or group of users to access the multi-tenant service as if the user or group of users of the second tenant were a user or group of users of the first tenant; and
    at the management console, associating the external access object which has been mapped based on the identity criteria used to associate the user or group of users from the second tenant with a set of the first tenant's resources and/or data of the multi-tenant service so that the user or group of users of the second tenant can access the associated set of resources and/or data.

2. The method in accordance with claim 1, wherein associating the external access object with a set of the first tenant's resources and/or data comprises:
    associating with the external access object at the management console one or more administrative tasks that define operations that may be performed on the set of the first tenant's resources and/or data and one or more target objects on which the associated administrative tasks may be performed.

3. The method in accordance with claim 2, wherein the one or more target objects are one of a set of user accounts associated with the first tenant, or a set of documents associated with the first tenant.

4. The method in accordance with claim 2, wherein the one or more target objects include all target objects associated with the first tenant at the management console.

5. The method in accordance with claim 1, wherein associating the external access object with a set of the first tenant's resources and/or data comprises:
    associating with the external access object at the management console one or more documents that may be subjected to a collaborative effort.

6. The method in accordance with claim 1, wherein the identity criteria includes at least one of a user identifier, the role of the user in the second tenant, the name of the second tenant, a digital certificate, and a token.

7. The method in accordance with claim 6, wherein the user identifier is a global identifier representing the name of the user.

8. The method in accordance with claim 1, wherein the external access object is associated with an administrative role that the user or group of users will perform in the first tenant.

9. The method in accordance with claim 6, wherein the administrative roles are one of a company administrative role, a license administrative role, a service administrative role, a helpdesk administrative role, a user role, a user administrative role, or a collaboration role.

10. A method, performed in a multi-tenancy environment, for permitting a first tenant to provide services to a user or group of users associated with a second tenant by specifying access permission that enables the user or group of users of the second tenant to access the first tenant's resources and/or data, the method comprising:
    hosting a multi-tenant service in a multi-tenancy environment, the multi-tenant service hosting a first and a second tenant;
    receiving at the management console a user request of a user or group of users of the second tenant for access to the first tenant's resources and/or data of the multi-tenant service to perform operations on the first tenant's resource and/or data;
    determining at the management console identity criteria of the user or group of users of the second tenant;
    at the management console, based on the identify criteria determined for the user or group of users of the second tenant, mapping the user or group of users of the second tenant to an external access object that is associated with the first tenant, wherein the external access object is configured to represent the user or group of users of the second tenant when the user or group of users of the second tenant accesses the multi-tenant service such that the user or group of users appears as a user or group of users of the first tenant when accessing the multi-tenant service to thereby enable the user or group of users of the second tenant to access the first tenant's resources and/or data of the multi-tenant service; and
    determining at the management console that the user or group of users of the second tenant has permission to access the first tenant's resources and/or data of the multi-tenant service and to perform the operations based on access permissions specified within the external access object.

11. The method in accordance with claim 10, wherein determining at the management console that the user of the second tenant has permission to access the first tenant's resources and/or data and to perform the operations based on the mapping to the external access object comprises:

associating the external access object with a set of administrative tasks defining the operations that may be performed on the first tenant's resources or data;

determining at the management console that the set of administrative tasks the user desires to perform is permitted by the external access object based on the mapping; and determining at the management console that a designated target object of the first tenant's resources and/or data is permitted to be subjected to the set of administrative tasks.

12. The method in accordance with claim 10, wherein determining at the management console that the user of the second tenant has permission to access the first tenant's resources and/or data and to perform the operations based on the mapping to the external access object comprises:

determining that one or more documents that are to be subjected to collaboration between a user of the first tenant and the user of the second tenant are associated with the external access object.

13. The method in accordance with claim 10, wherein the external access object is a first external access object, the method further comprising:

mapping at the management console the user of the second tenant to a second external access object associated with the first tenant based on the identity criteria, wherein the second external access object is configured to represent the user of the second tenant when the user of the second tenant access the multi-tenant service such that the user appears as a user of the first tenant when accessing the multi-tenant service to thereby enable the user of the second tenant to access the first tenant's resources and/or data of the multi-tenant service; and determining at the management console that the user has permission to access the first tenant's resources and/or data based on the mapping to the second external access object.

14. The method in accordance with claim 12, wherein determining at the management console that the user has permission to access the first tenant's resources and/or data and to perform the operations based on the mapping to the second external access object comprises:

associating the second external access object with a second set of administrative tasks defining the operations that may be performed on the first tenant's resources or data;

determining at the management console that the second set of administrative tasks the user desires to perform is permitted by the second external access object based on the mapping; and determining at the management console that a second designated target object of the first tenant's resources and/or data is permitted to be subjected to the set of administrative tasks.

15. The method in accordance with claim 12, wherein determining at the management console that the user of the second tenant has permission to access the first tenant's resources and/or data and to perform the operations based on the mapping to the second external access object comprises:

determining that one or more second documents that are to be subjected to collaboration between a user of the first tenant and the user of the second tenant are associated with the second external access object.

16. The method in accordance with claim 10, further comprising:

disabling at the management console the external access object such that the user of the second tenant no longer has permission to access the first tenant's resources and/or data.

17. The method in accordance with claim 16, further comprising:

subsequent to disabling the external access object, once again enabling the external access object such that user of the second tenant once again has permission to access the first tenant's resources and/or data.

18. The method in accordance with claim 10, wherein the user comprises a group of multiple users of the second tenant.

19. One or more hardware storage devices having stored thereon computer-executable instructions that, when executed by the one or more processors, perform a computer-implemented method for permitting a first tenant to provide services to a user or group of users associated with a second tenant by specifying access permission that enables the user or group of users of the second tenant to access the first tenant's resources and/or data, the computer-implemented method comprising:

determining identity criteria for one or more users or group of users of the second tenant who will provide the contracted for specified operations;

receiving at the management console a request from one of the one or more users or group of users of the second tenant for access to the first tenant's resources and/or data of the multi-tenant service that are to be subjected to the specified operations;

mapping an external access object associated with the first tenant to the one of the one or more users or group of users of the second tenant based on the identity criteria, wherein the external access object is configured to represent the one of the one or more users or group of users of the second tenant when the user or group of users of the second tenant accesses the multi-tenant service such that the user or group of users appears as a user or group of users of the first tenant when accessing the multi-tenant service to thereby enable the user or group of users of the second tenant to access the first tenant's resources and/or data of the multi-tenant service;

based on the identity criteria, associating the external access object with a set of the one or more administrative tasks, wherein the set of administrative tasks define the specified operations that may be performed on the first tenant's resources and/or data by the one of the one or more users or group of users;

determining that access is to be granted to the first tenant's resources and/or data by determining that the one or more administrative tasks are permitted by the external access object; and determining that a designated target object of the first tenant's resources and/or data is permitted to be subjected to the one or more administrative tasks.

20. The one or more hardware storage devices in accordance with claim 19, wherein the computer-executable instructions stored thereon, when executed by the one or more processors, further perform as part of the computer-implemented method:

disabling the external access object such that the one of the one or more users or group of users of the second tenant no longer has permission to access the first tenant's resources and/or data.

* * * * *